Figure 1:
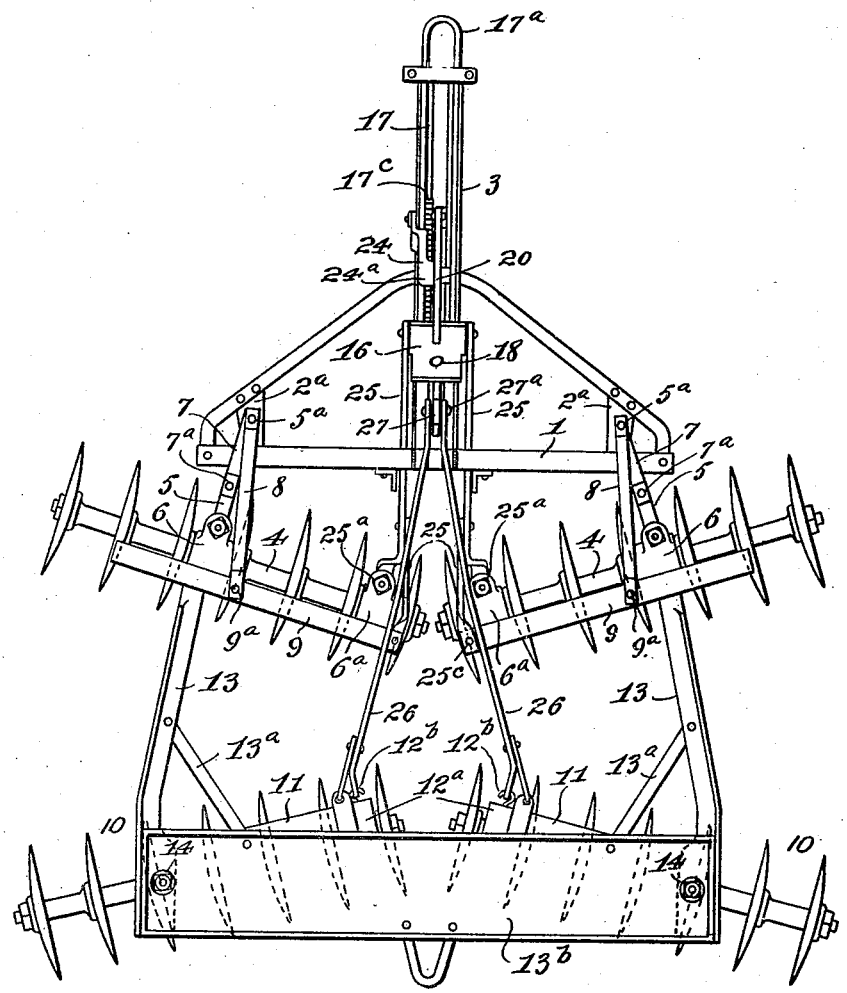

July 13, 1926.

F. C. WARNE 1,592,057

DISK HARROW

Filed Oct. 14, 1920

3 Sheets-Sheet 1

Inventor
Frederick C. Warne

By
Chas. E. Billman, Attorney

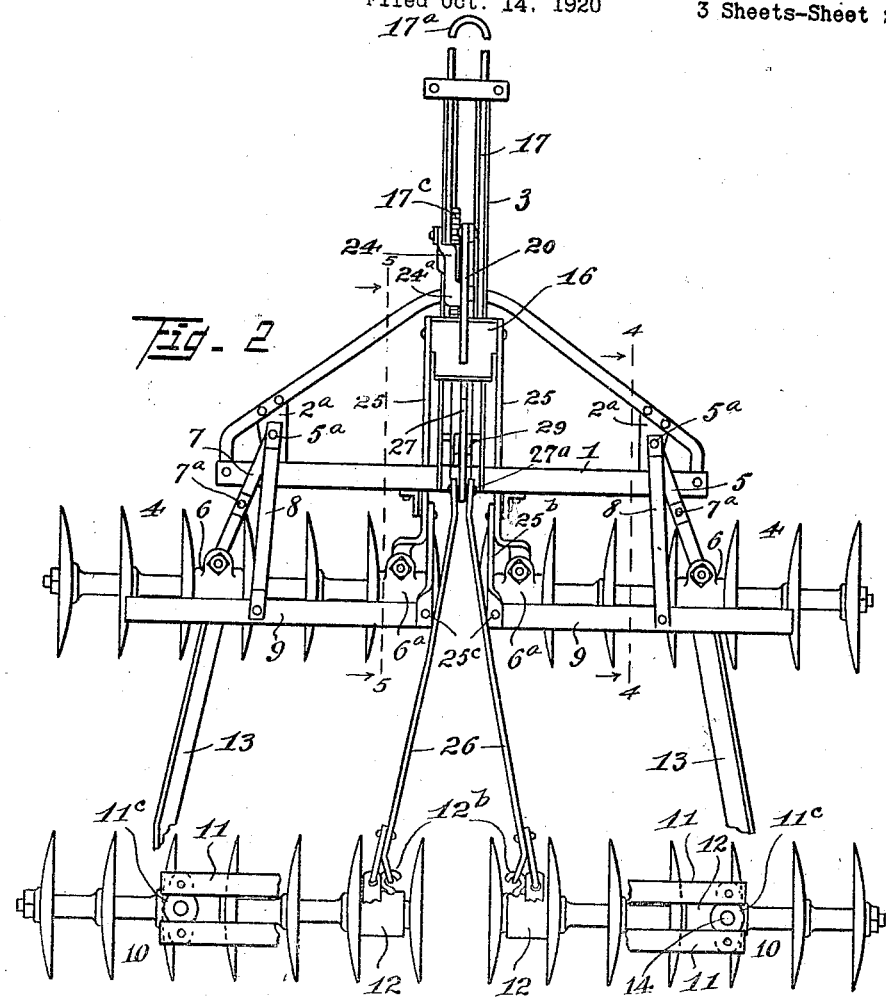

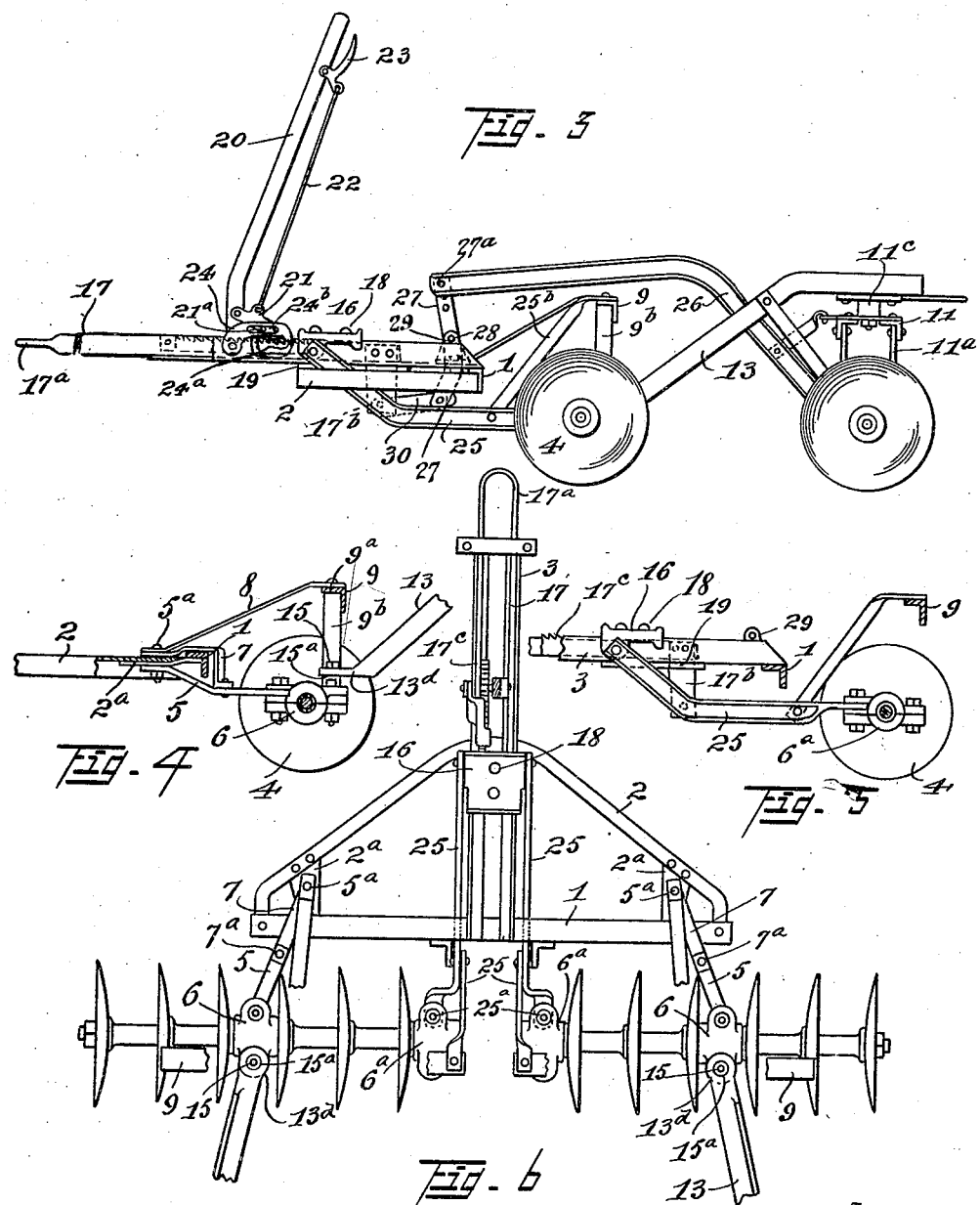

Patented July 13, 1926.

1,592,057

UNITED STATES PATENT OFFICE.

FREDERICK C. WARNE, OF MANSFIELD, OHIO, ASSIGNOR TO RODERICK LEAN MFG. CO., OF MANSFIELD, OHIO, A CORPORATION OF NEW JERSEY.

DISK HARROW.

Application filed October 14, 1920. Serial No. 416,816.

My invention relates to improvements in harrows, and more particularly to that class or type known as "double" or "tandem" disk harrows, in which a front pair and a rear pair of adjustably mounted rotary disk gangs are adapted to be angled or turned in opposite directions relative to each other and to the line of draft, as disclosed, for example, in Warne Patent No. 1,344,159, of June 22, 1920, and Warne Patent No. 1,189,890, of July 4, 1916.

As distinguished, however, from my said former patents in which front and rear harrow units are employed and movably connected by flexibly connected relatively movable draft or reach bars for making short turns, my present harrow structure relates to that class or type of tandem disk harrows in which a single relatively rigid harrow frame is employed and to which the front and rear implement gangs are attached. In my present harrow structure, the harrow frame as a whole is relatively fixed, comprising, in the present instance, a draft frame and a relatively rigid tandem harrow frame, said draft and harrow frames embodying relatively longitudinally fixed draft bars or connections connected, in the present instance, to the pivoted portions of the front and rear implement gangs.

As distinguished from my said previous patents, the pivoted portions of the front and rear gangs are relatively fixed longitudinally, and as a means of adapting the structure for use in connection with tractors, relatively longitudinally movable draft connections or links are flexibly connected to the inner ends of the front and rear gangs and connected to relatively movable draft members suitably mounted, guided and adjusted on the draft frame whereby such draft connections may be moved relatively thereby carrying the inner ends of said front and rear gangs toward and from each other longitudinally for moving and securing such gangs in any desired angular position to each other and to the line of draft by the operator of the tractor while in the seat or cab of the latter, the construction and relative arrangement of the parts being such that when the disk gangs are locked in their normal working of fully angled position, or in an intermediate angled position, and are relatively released or unlocked by the operator thru such manually operated adjusting and locking mechanism while the tractor is in motion, such disk gangs will automatically assume thru such draft connections their non-working or non-angled transporting position, or a less angular working position, as the case may be, and as the operator may elect, and may be stopped and locked in such elected position while the tractor is in motion.

The primary object of the invention is to provide a generally improved tandem harrow or implement of the class indicated, which will be exceedingly simple in construction and efficient in operation, and which by reason of the general arrangement and combination of parts may be readily operated and controlled and in which the movement of the disk gangs from their fully angled or working position to a less angular working position or to their parallel extending transporting position, will be entirely automatic thru the draft of the tractor when the manually operated adjusting and locking mechanism between the relatively fixed and movable parts is released.

With the above mentioned and other ends in view, the invention consists in the novel construction, arrangement and combination of parts, hereinafter described, illustrated in one of its embodiment in the accompanying drawings, and particularly pointed out in the appended claims.

Referring to the drawings forming a part of this specification, Figure 1 is a top plan view of a harrow constructed in accordance with this invention, the disk gangs being in their angled or working positions.

Fig. 2, a top plan view of the same, with the gangs in their parallel or transporting positions, certain parts of the relatively fixed harrow frame being broken away for the purpose of clearer illustration of the parts.

Fig. 3, a side elevation of the same.

Fig. 4, is a longitudinal sectional view thru the front or draft frame and one of the gangs, taken substantially on line 4—4 of Fig. 2.

Fig. 5, a longitudinal sectional view taken on line 5—5 of Fig. 2, and illustrating in particular one of the relatively movable draft connections between the movable draft member and the inner end of one of the front gangs.

Fig. 6, a top plan view of the draft frame and front disk gangs, certain portions of the gang frames being broken away for the purpose of clearer illustration of the parts.

Fig. 7, a fragmentary central longitudinal sectional view of the relatively movable draft connections attached to the inner ends of the front and rear gangs, the manually operable adjusting and locking mechanism being removed for the purpose of clearer illustration of the parts.

Similar numerals of reference designate like parts thruout all the figures of the drawings.

The improved harrow or tillage implement comprises a front pair of tillage gangs and a rear pair of tillage gangs. The front and rear pairs of tillage gangs may be of any suitable and conventional form, and for the purpose of illustration I have shown my improved draft appliance and its connections applied to or embodied in a double or tandem disk harrow of the single or rigid harrow frame type.

The improved harrow embodies a suitable draft frame consisting, in the present instance, of a transverse bar 1, and a curved draft frame member 2, the latter having its forward middle portion secured to a stub-pole 3, which latter is made up of spaced angle bars secured at their rear to the transverse bar or member 1, and, in the present instance, forming a guide or slideway for the improved longitudinally movable draft appliance hereinafter described.

As a means of connecting the draft frame to the front disk gangs 4, relatively longitudinally fixed draft bars or links 5, are pivotally connected to filler blocks 2ª, said longitudinally fixed draft members or bars extending rearwardly beneath the transverse bar 1, and being flexibly connected to the axle boxes 6, somewhat beyond the centers of the disk gangs so that the inner ends of the latter will have a tendency to swing rearwardly and assume a rearwardly converging position. As a means of supporting and maintaining the draft bars or links 5, in proper horizontal relation to the transverse bar 1, supporting clips 7, are pivotally mounted upon the filler blocks 2ª, and are secured by means of pivot bolts 5ª, secured to the forward ends of the draft bars 5, said clips 7, extending rearwardly and being secured to the top intermediate portions of the bars 5, by means of pivot bolts 7ª, and as a further means of securing the draft frame to the front disk gangs, draft bars or links 8, are connected to the pivot bolts 5ª, above the supporting clips 7, and extend upwardly and rearwardly and are flexibly connected to the upper or transverse bars 9, of the front gang frames by means of pivot bolts 9ª. The gang frame bars 9 are connected to the disk gangs 4, by means of supporting bracket or brace members 9ᵇ, extending downwardly and suitably secured to the axle boxes 6.

The rear harrow section or unit, in the present instance, comprises a pair of rear disk gangs 10, suitably mounted and supported in gang frames 11, the latter being provided with supporting brackets 11ª, connected to axle boxes 12.

The relatively rigid or main harrow frame comprises, in the present instance, relatively longitudinally fixed draft members or reach bars 13, said draft members 13 of the frame being connected, in the present instance, by means of bottom plate 13ᵇ, of a weight box. The draft or frame reach bars 13, are additionally braced and reinforced relative to each other, by means of corner brace members 13ª.

The harrow frame is provided with pivot bearing bolts 14, suitably secured to the rear gang frames 11, said bolts 14, in the present instance, extending thru the rear ends of the frame draft members 13, and into suitable bearings 11ᶜ (see Fig. 2), of the gang frames.

As a means of connecting the forward ends of the draft or reach bars 13, to the draft members 5, of the draft frame, indirectly, and at the same time forming a suitable coupling or connection with the pivoted portions of the front disk gangs 4, the front ends of the frame draft members 13, extend downwardly and terminate in bearing heads 13ᵈ, flexibly connected to the rear sides of the axle boxes 6, thru the medium of vertically extending pivot bolts 15, the latter being provided with bushings 15ª (see Fig. 6), the bearing openings in the heads 13ᵈ, and bushings 15ª, being such as to provide a limited vertical movement between the laterally rigid frame bars 13, and the axle boxes 6, to permit the necessary vertical or undulatory movement between the draft and harrow frames in passing over obstructions or uneven soil being cultivated.

Referring now to the improved draft appliance and its gang connecting, adjusting and controlling mechanism, whereby the operator of the tractor, while in his usual driving position on the latter, and when the disk gangs are locked in their fully angled working positions, or in their parallel transporting positions, or intermediate angled positions, and are relatively released or unlocked, will permit such gangs to be moved from their fully angled position to a less angular position or to a transporting non-angular position thru the forward draft of the tractor, or, if desired, will cause such gangs to be moved in an opposite direction by backing the tractor, and thru a rearward relative movement of the latter and said draft appliance, to their various angular working positions, as the case may be, and as the operator may elect, and whereby the same may be stopped and locked in any such elected position, it will be seen that the improved draft appliance comprises a longitudinally movable draft member or element, mounted, in the present instance, in the stub-pole 3, of the draft frame, and consisting, in the present instance, of a draft head or block 16, adapted to slide along the angular members of the stub-pole 3, said block 16, being connected to and controlled by a longitudinally movable draft bar or yoke 17, terminating at its forward end in a draft loop 17$^a$. The draft block or head 16, in the present instance, is connected to the yoke 17, by means of bolts 18, extending downwardly and secured to a slide or retaining plate 19, the latter being provided with a slotted head extending over a depending arm 17$^b$, at one end of the yoke 17.

As a means of intermittently engaging and feeding the draft bar or yoke 17, rearwardly thru working impulses imparted to the hand lever 20, the lower portion of the latter is provided with a pivoted pawl 21, adapted to be moved to a released position by means of the rod 22, leading to a releasing lever 23, at the handle portion of the hand lever.

As a means of manually operating and controlling the movements of the draft bar or yoke 17, and the draft head or block 16, attached thereto and the connections leading to the inner ends of the pivoted disk gangs as hereinafter described, one side of the draft yoke 17, is provided with a toothed rack 17$^c$, and as a means of preventing any shifting or retrograde movement of the relatively movable draft member made up of the draft bar 17, and block or head 16, after each working impulse given to the hand lever 20, the stub-pole 3, is provided at one side with a pivoted locking dog 24, the latter being provided with a detent 24$^a$, adapted to normally ride upon the teeth of the rack 17$^c$, and as a means of simultaneously releasing the pivoted pawl 21, and the locking dog 24, and holding such parts in such released positions for the extended shifting or forward movement of the draft bar 17, and its attachments, by the forward draft of the tractor, the locking dog is provided with a slot or guideway 24$^b$, loosely receiving and containing a pin or projection 21$^a$, extending laterally from the lever pawl 21, so that when the free end of the pivoted pawl 21, is moved in an extended upward direction it will engage in the upper portion of the slot or guideway 24$^b$, and raise and hold the locking dog 24 out of engagement with the teeth of the rack.

The draft connections or bars, leading from the draft appliance to the inner ends of the front and rear disk gangs, comprise longitudinally movable draft bars 25, leading from the head 16, of the yoke 17, of the relatively movable draft member, and connected to the inner ends of the front disk gangs thru the medium of pivot bolts 25$^a$, secured to the inner ends of the axle boxes 6$^a$, said draft bars 25, being provided with upwardly and rearwardly extending draft links 25$^b$, connected to the inner ends of the bars 9, of the front gang frames by means of pivot bolts 25$^c$.

As a means of simultaneously moving the inner ends of the rear disk gangs 10, and making the connection such that the inner ends of the front and rear gangs will be moved toward and from each other in moving the same to and from their angular or non-angular positions, respectively, longitudinally movable draft bars 26, are provided, said bars being connected at their rear ends to the inner axle boxes 12$^a$ by means of hooks 12$^b$, the forward ends of the relatively longitudinally movable draft bars 26, being connected to the top portion of a rocker lever 27, by means of a pivot bolt 27$^a$ (Fig. 3), said rocker 27, being pivotally mounted on a pivot bolt 28, on brackets 29 of the stub-pole 3, the lower end of the rocker 27, being connected to the depending arm 17$^b$, of the relatively movable draft member or yoke 17, by means of links 30, the latter being provided at their opposite ends with pivots 30$^a$, see Fig. 7.

It will thus be seen that the longitudinally movable draft bars 25 and 26, connected to opposite ends of the rocker lever 27, will be moved simultaneously in opposite directions with the movements of the rocker thru the movements of the relatively movable draft member or appliance, made up, in the present instance, of the block or head 16, and yoke 17, so that the inner ends of the front and rear disk gangs will be properly moved with the forward and rearward relative movements of the tractor and thru the draft appliance, it being thus possible to move the front and rear gangs to any desired angle by backing the tractor, and when the angle desired is secured the parts may be locked to hold the gangs in such position against the forward movement of the tractor.

Having thus described one of the embodiments of my invention, without having attempted to set forth all the forms in which it may be made, of all the modes of its use, what I claim and desire to secure by Letters Patent, is,—

1. In a tandem harrow, a draft frame and a rigid tandem harrow frame, disc gangs flexibly connected to said draft and harrow frames, a relatively movable draft member on said draft frame, draft links connecting said movable draft member to the inner ends of said gangs whereby the latter may be simultaneously moved toward and from each other, and means for manually adjusting and securing said relatively movable draft member with a consequent shifting and locking of the gangs in their desired position.

2. In a harrow, a draft frame, implement gangs flexibly connected to said draft frame, a harrow frame flexibly connected for vertical movement to said implement gangs, implement gangs connected to said harrow frame, and a relatively movable draft device on said draft frame connected to the inner ends of said implement gangs whereby the latter may be simultaneously angled and the inner ends of each pair moved toward and from each other.

3. In a harrow, a draft frame, a front pair of implement gangs pivotally connected to said draft frame, a rigid harrow frame having rigid reach bars connected to the pivoted portions of said implement gangs, a rear pair of implement gangs pivotally connected to said harrow frame, and relatively movable draft member slidable on said draft frame and provided with relatively movable draft links connected to the inner ends of said front and rear pairs of implement gangs whereby the latter may be simultaneously angled by moving the inner ends of each pair uniformly toward and from each other.

4. In a tractor-drawn tandem harrow, a draft frame and a tandem harrow frame, front and rear pairs of disc gangs pivotally connected to said draft and harrow frames, a relatively movable draft appliance on said draft frame, draft links connecting said movable draft appliance to the inner ends of said front and rear pairs of gangs whereby the latter may be simultaneously angled relative to each other, and means for manually adjusting said relatively movable draft appliance in one direction and locking the same against movement in the other by the forward draft of the tractor.

5. In a tillage implement, a plurality of tillage gangs, relatively longitudinally fixed and movable draft connections flexibly connected to the intermediate and inner portions of said gangs, respectively, a longitudinally fixed guide member for said movable draft connections, means for actuating said movable draft connections by the relative forward and rearward movement of the tractive force on the implement for adjusting said gangs in angular relation, and means for manually moving and adjusting said movable draft connections and gangs toward the parallel transporting position of the latter.

In testimony whereof I have affixed my signature.

FREDERICK C. WARNE.